United States Patent
Venkatesan et al.

(10) Patent No.: US 9,608,938 B2
(45) Date of Patent: Mar. 28, 2017

(54) METHOD AND SYSTEM FOR TRACKING AND MANAGING NETWORK FLOWS

(71) Applicants: Sivakumar Venkatesan, Santa Clara, CA (US); Mayuresh Bakshi, Santa Clara, CA (US); Rohit Sharma, Santa Clara, CA (US)

(72) Inventors: Sivakumar Venkatesan, Santa Clara, CA (US); Mayuresh Bakshi, Santa Clara, CA (US); Rohit Sharma, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 329 days.

(21) Appl. No.: 14/457,660

(22) Filed: Aug. 12, 2014

(65) Prior Publication Data
US 2016/0050150 A1    Feb. 18, 2016

(51) Int. Cl.
*H04L 12/26* (2006.01)
*G01R 31/08* (2006.01)
*H04L 12/935* (2013.01)
*H04L 12/931* (2013.01)
*H04L 12/947* (2013.01)

(52) U.S. Cl.
CPC .......... *H04L 49/3009* (2013.01); *H04L 49/25* (2013.01); *H04L 49/506* (2013.01); *H04L 43/0894* (2013.01)

(58) Field of Classification Search
CPC . H04L 49/3009; H04L 43/0894; H04L 29/06; H04L 65/4084; H04L 12/26; H04L 49/506; H04L 67/1008; H04L 67/1025; H04L 47/125; H04L 49/25
USPC .......................................................... 370/236
See application file for complete search history.

(56) References Cited

U.S. PATENT DOCUMENTS

| | | | |
|---|---|---|---|
| 8,243,598 B2 * | 8/2012 | Battestilli | H04L 47/125 370/230.1 |
| 2005/0141423 A1 * | 6/2005 | Lee | H04L 43/026 370/232 |
| 2008/0291915 A1 * | 11/2008 | Foschiano | H04L 63/1441 370/392 |
| 2009/0310616 A1 * | 12/2009 | Cummings | H04L 49/254 370/401 |
| 2011/0199924 A1 * | 8/2011 | Breslin | H04L 43/0882 370/252 |
| 2012/0233349 A1 * | 9/2012 | Aybay | H04L 47/2441 709/234 |

(Continued)

*Primary Examiner* — Edan Orgad
*Assistant Examiner* — Vanneilian Lalchinthang
(74) *Attorney, Agent, or Firm* — Osha Liang LLP

(57) ABSTRACT

A method and system for tracking and managing network flows including receiving a first flow counter value for a flow of first flows and determining that the flow is an elephant flow. The method further includes obtaining flow egress port information by determining an egress port on a switch for each of the first flows, obtaining port congestion information for the switch, where the port congestion information includes port congestion data for each egress port, and selecting, based on the port congestion information and the flow egress port information, a new egress port for the flow, and sending a request to update a switch chip on the switch, where the request specifies that subsequently received packets for the flow are to be forwarded out of the new egress port.

20 Claims, 11 Drawing Sheets

(56) References Cited

U.S. PATENT DOCUMENTS

| | | | | |
|---|---|---|---|---|
| 2014/0119203 A1* | 5/2014 | Sundaram | ............... | H04L 43/50 370/250 |
| 2014/0126393 A1* | 5/2014 | Kirshnan | .............. | H04L 43/026 370/252 |
| 2014/0136723 A1* | 5/2014 | Branson | ................ | H04L 67/322 709/231 |
| 2015/0089045 A1* | 3/2015 | Agarwal | ............... | H04L 43/024 709/224 |

* cited by examiner

METHOD AND SYSTEM FOR TRACKING AND MANAGING NETWORK FLOWS

BACKGROUND

It is critical that network infrastructure within a data center be resilient in order to ensure that data is able to be communicated on the network infrastructure with limited latency. Network engineers typically take various approaches for ensuring that the network infrastructure continues to enable data communication even when various portions of the network infrastructure are not operating correctly. However, as network infrastructures have become more complex, this task has become increasingly more difficult.

SUMMARY

In general, in one aspect, the invention relates to a non-transitory computer readable medium comprising instructions, which when executed by a processor perform a method, the method comprising receiving a first flow counter value for a flow of a first plurality of flows, determining that the flow is an elephant flow, obtaining flow egress port information by determining an egress port from a plurality of egress ports on a switch for each of the first plurality of flows, obtaining port congestion information for the switch, wherein the port congestion information comprises port congestion data for each egress port of the plurality of egress ports, selecting, based on the port congestion information and the flow egress port information, a new egress port for the flow, and sending a request to update a switch chip on the switch, wherein the request specifies that subsequently received packets for the flow are to be forwarded out of the new egress port.

In general, in one aspect, the invention relates to a method for modifying a flow, the method comprising receiving a first flow counter value for a flow of a first plurality of flows, identifying, using the first flow counter value, that the flow is an elephant flow, obtaining flow egress port information by determining an egress port from a plurality of egress ports on a switch for each of the first plurality of flows, obtaining port congestion information for the switch, wherein the port congestion information comprises port congestion data for each egress port of the plurality of egress ports, selecting, based on the port congestion information and the flow egress port information, a new egress port for the flow, and sending a request to update a switch chip on the switch, wherein the request specifies that subsequently received packets for the flow are to be forwarded out of the new egress port.

In general, in one aspect, the invention relates to a switch, comprising a switch chip, a plurality of egress ports, memory, a data plane, wherein the data plane comprises the switch chip, the plurality of egress ports, and memory, a processor, a switch operating system (SOS), and a control plane comprising the processor and the SOS, the SOS comprising instructions, which when executed by the processor, enable the switch to perform a method, the method comprising receiving, from the memory in the data plane, a first flow counter value for a flow of a first plurality of flows, identifying, using the first flow counter value, that the flow is an elephant flow, obtaining flow egress port information by determining an egress port from the plurality of egress ports on the switch for each of the first plurality of flows, obtaining port congestion information for the switch, wherein the port congestion information comprises port congestion data for each egress port of the plurality of egress ports, selecting, based on the port congestion information and the flow egress port information, a new egress port for the flow, and sending a request to the switch chip in the data plane to update the switch chip, wherein the request specifies that subsequently received packets for the flow are to be forwarded out of the new egress port.

Other aspects of the invention will be apparent from the following description and the appended claims.

DETAILED DESCRIPTION

Figure 1:
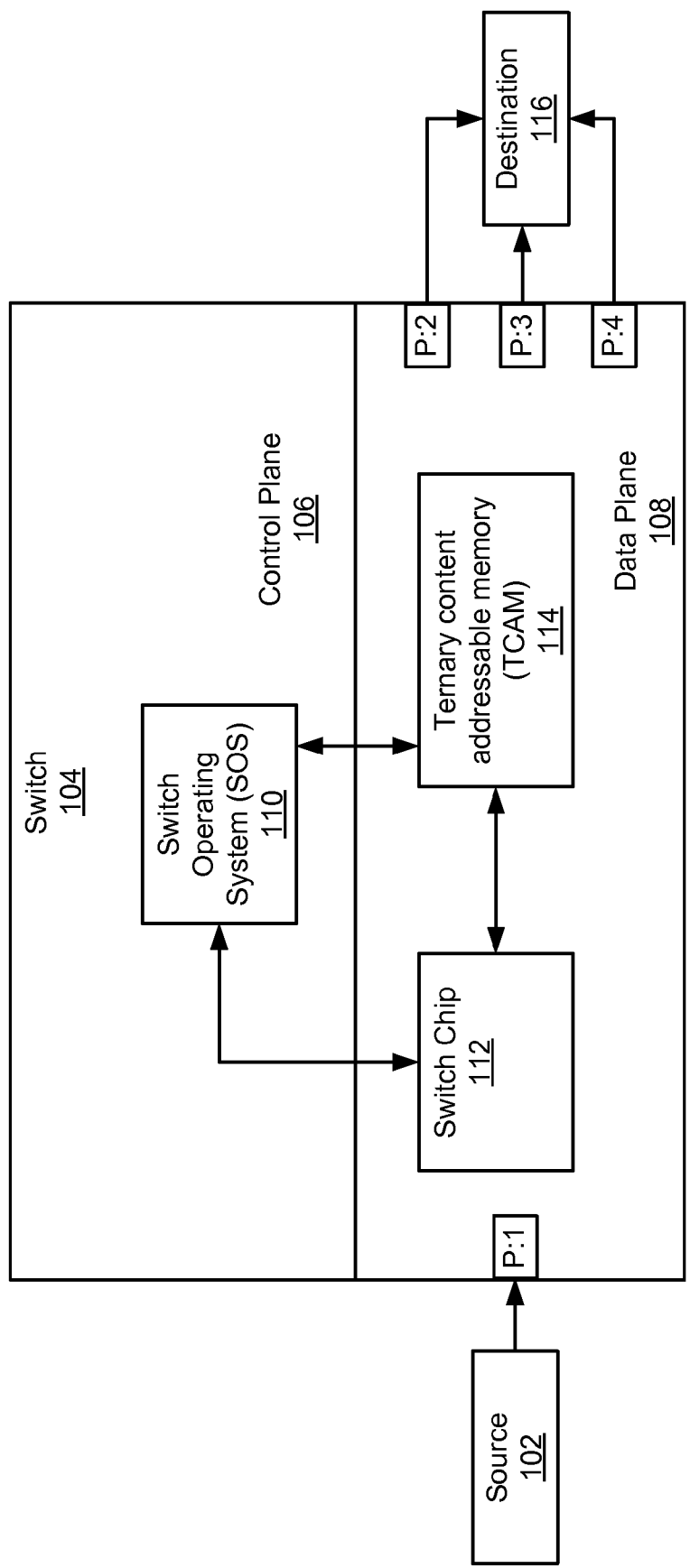
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for tracking a flow in a network. Specifically, embodiments of the invention relate to tracking a flow in a network that causes congestion of an egress port on a switch. A new egress port on the switch may be used to forward subsequently received packets by identifying an alternate path for the flow in the network.

The following description describes embodiments of the invention in which a flow is tracked in a network described below. However, the invention is not limited to switches; rather, embodiments of the invention may be extended to the tracking of a flow for other network devices, such as routers. Also, embodiments of the invention are not limited to network devices in a data center; rather embodiments of the invention may be extended to environments other than a data center in which network devices require flow tracking and redirection.

FIG. 1 shows a system in accordance with one or more embodiments of the invention. A flow is a sequence of packets traveling from a source (102) through a switch fabric to reach a destination (116). For example, a flow may correspond to a sequence of packets traveling from a source (102) to a switch (104) to a destination (116) as depicted by FIG. 1. Each component associated with the flow (i.e., source, switch fabric, and destination) are described below.

In one embodiment of the invention, the source (102) is a network device (e.g., a server, a switch, and a router) from which a packet originated. A network device is any computer or electronic device that shares information (i.e., packets) and resources to other network devices. A packet is a unit of data capable of being routed through a network using identifying information encapsulated in the packet. In one embodiment of the invention, packets are binary data encapsulated within identifying information that identifies, at least, where the packet came from (i.e., source (102)) and where it is to be sent (i.e., destination (116)). In one embodiment of the invention, the packets are encapsulated within identifying information including Internet protocol (IP) addresses. An IP address is a numerical label that uniquely identifies a network device. Examples of IP address formats include version-4 (IPv4) and version-6 (IPv6). One of ordinary skill in the art will appreciate that although a source (102) is shown in FIG. 1, there may exist multiple sources.

In one embodiment of the invention, a server is a computer system. A computer system may include any type of system (e.g. software and computer hardware) that is configured to generate, send, receive, and/or process requests and replies either locally or over a network using software and computer hardware. The server may include a processor, memory, and one or more physical network interfaces. Examples of types of servers include, but are not limited to, DHCP servers, database servers, application servers, file servers, print servers, and mail servers.

In one embodiment of the invention, a destination (116) is a network device (e.g., computer, a server, a switch, and a router) that is configured to receive packets. As described above, the packet is encapsulated with a destination IP address that corresponds to the destination (116). One of ordinary skill in the art will appreciate that although destination (116) is shown in FIG. 1, there exist multiple destinations.

In one embodiment of the invention, the switch fabric is the network infrastructure of a network. The network infrastructure is the configuration of connections between one or more network devices in the network, including switches, routers, hosts, and servers. In FIG. 1, the switch fabric corresponds the switch (104). However, as described, the switch fabric is not limited to a single switch. For example, there may exist connections between multiple network devices between a source (102) and a destination (116). The flow then involves packets traveling from the source (102) followed by multiple network devices to reach the destination (116). An exemplary switch fabric with multiple network devices is described in FIG. 4A below.

In one embodiment of the invention, a switch (104) is a physical device that includes persistent storage, memory (e.g., Random Access Memory), one or more processors, and two or more physical ports. Each port may or may not be connected to another network device on a network (e.g., a server, a switch, a router, etc.). The switch (104) is configured to receive packets via ingress ports on the switch and determine whether to (i) drop the packet, (ii) process the packet in accordance with one or more embodiments of the invention, and/or (iii) send the packet out an egress port on the network device. An ingress port on a switch is a physical port on the switch that receives packets from a network device. An egress port on a switch is a physical port on the switch that transmits packets to a network device.

How the switch makes the determination of whether to drop the packet or send the packet to another network device on the network depends, in part, on whether the switch is a layer-2 (L2) switch or a layer-3 (L3) switch (also referred to as a multilayer switch). If the switch is operating as a L2 switch, the switch uses the destination media access control (MAC) address along with a forwarding table to determine out of which egress port to send the packet. If the switch is operating as a L3 switch, the switch uses the destination internet protocol (IP) address along with a routing table to determine out of which egress port to send the packet. If the switch is a multilayer switch, the multilayer switch includes functionality to process packets using both MAC addresses and IP addresses.

In addition to the functionality described above, the switch (104) may include functionality to execute protocols, such as link aggregation control protocol (LACP) and routing strategies, such as equal-cost multipath (ECMP). The switch (104) may implement other protocols or routing strategies without departing from the invention.

In one embodiment of the invention, LACP is used to form a link aggregation (LAG). A LAG is multiple physical links connecting two network devices that are bundled to form a single logical link. For example, the switch (104) has three physical links to the destination (116) through egress ports P:2, P:3, and P:4, respectively. A logical link representing the three physical links may be created using LACP to form a LAG. The logical link may then be used to abstract which of the physical links is used to send packets to the destination (116).

In one embodiment of the invention, a LAG creates redundancy in the network infrastructure to maintain or improve the throughput of the network. In one embodiment of the invention, throughput corresponds to the number of packets or bits transmitted per second. For example, a LAG may increase the throughput by balancing the traffic load across multiple physical links in the LAG, referred to as load balancing. As another example, the LAG maintains the throughput of the network in the event that one of the physical links in the LAG fails.

In one embodiment of the invention, the ECMP routing strategy identifies multiple best paths that have an equal numerical value based on a routing metric. A routing metric includes, but is not limited to, information related to the route the packet may take towards its destination (116) and may be represented by a numerical value representative of the "cost" of the route. For example, the cost of the route may be measured by the number of "hops" (i.e., network devices) that the packet must travel through before reaching its destination. For example, the number of hops may be used as the routing metric to calculate the cost of traveling from the source (102) to the destination (106). The routing metric calculates that the path from the source (102) to the switch (104) to the destination (106) has an equal number of hops regardless of the egress port chosen (i.e., P:2, P:3, and P:4).

The switch (104) includes a control plane (106) and a data plane (108) in accordance with one or more embodiments of the invention. Each component is described below.

In one embodiment of the invention, a control plane (106) is a part of the switch architecture configured to manage the possible paths of a flow in a network for a packet received by the switch. For example, the control plane (106) determines how a packet may reach its destination (116) given a source (104). A routing table may be used by the control plane (106) to determine a route for a packet received by the switch. A routing table may include routing information. The routing information includes information about the topology of the network surrounding it, the routes to network destinations, next-hop information, and routing metrics related to the routes. Each possible path determined by the control plane (106) defines a flow in the network in that the path enables the flow of packets from a source (104) to a destination (116). The invention is not limited to the use of a routing table by the control plane (106) as any data structure that includes routing information may be used.

In one embodiment of the invention, the control plane (106) includes a switch operating system (SOS) (110). In one embodiment of the invention, the SOS (110) is software that manages the hardware of the switch (e.g., switch chip (112), ternary content-addressable memory (TCAM) (114)) to provide functionality to the switch (e.g., routing). The SOS (110) manages the switch hardware using drivers that manage switch protocols (e.g., LACP, ECMP routing, etc.). For example, because the SOS (110) manages the switch protocols, the SOS (110) tracks any LAG aggregated by LACP. As another example, the SOS (110) has access to the multiple best paths found using the ECMP routing. In one embodiment of the invention, the SOS (110) includes a system database that holds state information of the switch based on switch protocols (e.g., LACP,ECMP routing) or interaction with the hardware (e.g., switch chip (112), TCAM (114)). For example, any hardware counters from the hardware are accessible by the SOS and may be stored in the system database.

In one embodiment of the invention, a data plane (108) is a part of the switch architecture that is configured to manage forwarding of a packet to either the destination (116) or to another network device based on the possible paths determined by the control plane (106). For example, a path may be chosen for a packet given that the path has the lowest cost based on a routing metric. The data plane (108) then forwards the packet to the next hop in the path to the packet's destination.

A data plane (108) may include a switch chip (112) and a ternary content addressable memory (TCAM) (114). In one embodiment of the invention, the switch chip (112) is hardware that determines which egress port on a switch to forward a packet. In one embodiment of the invention, the switch chip (112) is not reprogrammable. Said another way, the switch chip (112) does straight forwarding of packets as logic to deviate the forwarding of a packet is not included in the switch chip. In one or more embodiments of the invention, a switch chip may include resources to store and lookup fields from a packet (e.g., source IP address, destination IP address, etc.) to populate a routing table. In one or more embodiments of the invention, the switch chip may include further functionality to count packets and/or bytes associated with these resources. One of ordinary skill in the art will recognize that a switch chip that includes logic to deviate the forwarding of a packet may be used without departing from the invention.

In one embodiment of the invention, TCAM (114) is memory that is designed for rapid table lookups. In one embodiment of the invention, TCAM (114) includes functionality to match a flow based on a tuple associated with a packet received by a switch. The tuple includes a source IP address of the source of the flow, a source port of the source of the flow, a destination IP address of the destination of the flow, a destination port of the destination of the flow, and a protocol. The components in the tuple are derived from the identifying information encapsulated in the incoming packet described above. In one embodiment of the invention, the protocol refers to a protocol identifier for the protocol used to transmit the packet (e.g., 1 for internet control message protocol (ICMP), 2 for internet group management protocol (IGMP), 6 for transmission control protocol (TCP) and 17 for user datagram protocol (UDP)). In one embodiment of the invention, TCAM includes further functionality to store a flow counter value of a flow counter associated with each flow. Additionally or alternatively, the TCAM includes functionality to store a reference to a flow counter associated with each flow. In one or more embodiments of the invention, a flow counter counts the number of bytes and/or packets received on a flow associated with the flow counter.

One skilled in the art will recognize that the invention is not limited to the use of TCAM. Rather, any type of memory may be used in place of TCAM.

One skilled in the art will recognize that the architecture of a switch is not limited to the components shown in FIG. 1. For example, the switch includes processors not shown in FIG. 1. Further, the number of switches, sources, and destinations may vary depending on the requirements of the network in which it is located without departing from the invention.

Figure 2:
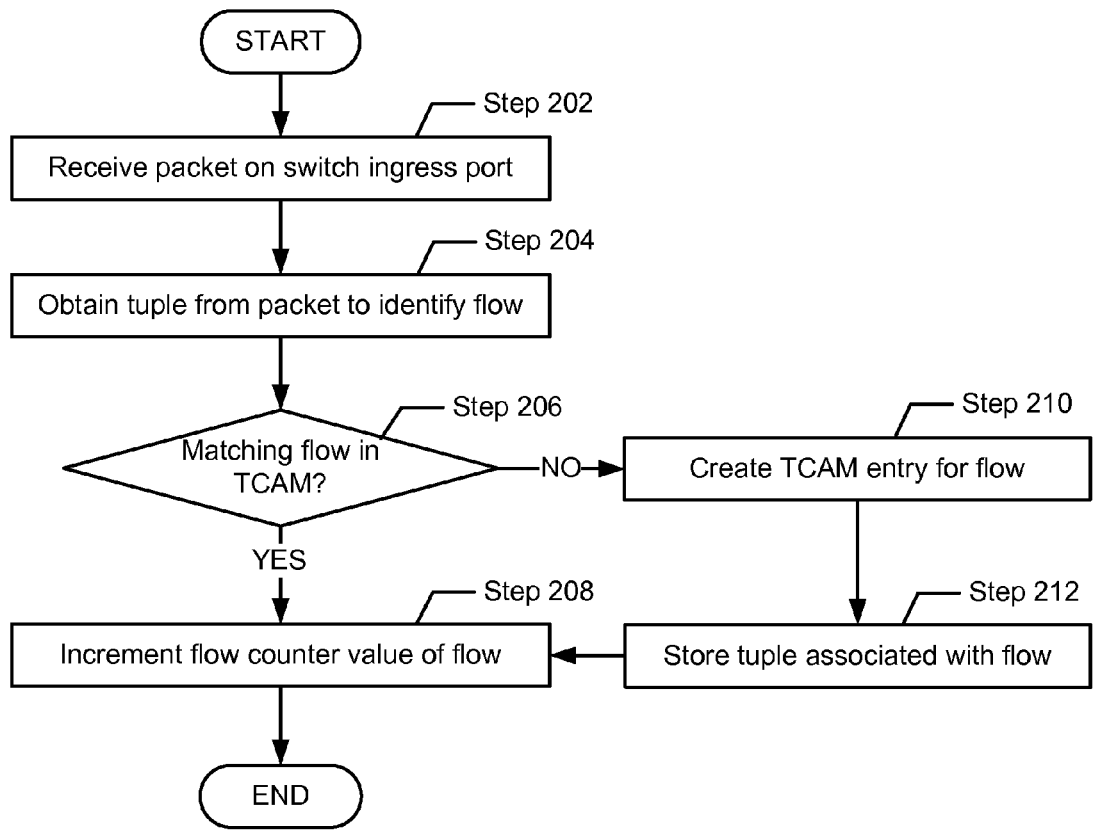
FIGS. 2-3 show flowcharts for tracking a flow by a switch in the system in accordance with one or more embodiments of the invention.
Figure 3:
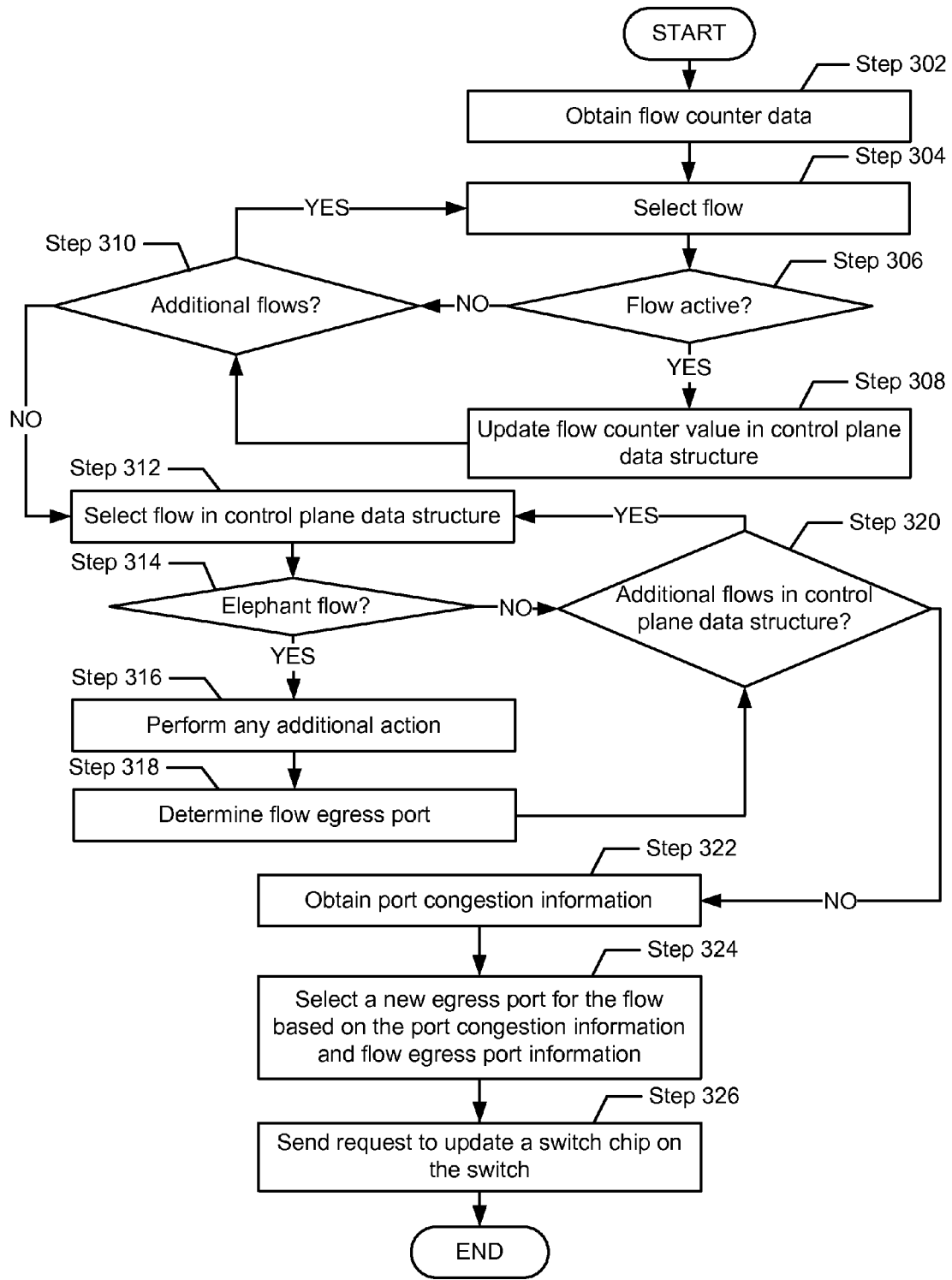

FIGS. 2-3 show flowcharts for tracking a flow in accordance with one or more embodiments of the invention.

While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 2-3 may be performed in parallel with any other steps shown in FIGS. 2-3 without departing from the invention.

FIG. 2 shows a method for the reception of a packet by the data plane of a switch in accordance with one or more embodiments of the invention.

Turning to FIG. 2, in Step 202, a packet is received on an ingress port of a switch. The packet is one of a sequence of packets associated with a flow in the network. The flow defines the source of the incoming packet and the destination of the incoming packet.

In Step 204, a tuple is obtained from the packet to identify the flow. The tuple includes a source IP address, a source port, a destination IP address, a destination port, and a protocol. The components of the tuple are obtained by extracting the components from the identifying information encapsulated in the packet. At a minimum, the source IP and the destination IP are included in the tuple.

In Step 206, a determination is made about whether the flow matches an entry in the TCAM. In one embodiment of the invention, each tuple is unique to the flow the tuple represents. In one embodiment of the invention, matching an entry in the TCAM to a flow corresponds to matching the tuple obtained in Step 204 to an entry in the TCAM. For example, a hash table may be used in which the tuple is the key (i.e., input value) and the corresponding flow is the value (i.e. output value). Each time the tuple is given as input to the hash table, the same flow is given as the output value.

If a determination is made that the flow matches an entry in the TCAM, the method may proceed to Step 208. In Step 208, the flow counter value is incremented via the flow counter of the flow. As described above, the flow is associated with a flow counter. In one or more embodiments of the invention, the TCAM stores the flow counter associated with the flow. Alternatively or additionally, the TCAM stores a reference to the flow counter associated with the flow. Once the flow is matched to the TCAM, the flow counter value for the flow is incremented by the number packets or bytes received. One of ordinary skill in the art recognizes that any memory may be used to store tuples that identify the flows and the flow counter or references to flow counter without departing from the invention.

Returning to Step 206, if a determination is made that the flow does not match an entry in the TCAM, the method may proceed to Step 210. In Step 210, a TCAM entry for the flow is created. In one or more embodiments of the invention, a flow counter is then associated with the flow. In Step 212, the tuple associated with the flow is stored in an entry of the TCAM. The method may then return to Step 208.

FIG. 3 shows a method for selecting a new egress port for a flow by the control plane of a switch in accordance with one or more embodiments of the invention.

Turning to FIG. 3, in Step 302, flow counter data is obtained. In one embodiment of the invention, the flow counter data corresponds to flow counter values for each flow that passes through a switch. In one embodiment of the invention, flow counter values are numerical values of the flow counters at the time the flow counter data is obtained. For example, a first flow counter value is 5 packets for flow 1 and a second flow counter value is 10 packets for flow 2 when the flow counter data is obtained. Subsequently, the first flow counter for flow 1 and the second flow counter for flow 2 may increment to 20 packets and 15 packets, respectively, the next time the flow counter data is obtained.

As described above, the SOS may communicate with the hardware in the data plane, including the TCAM. In one embodiment of the invention, the SOS obtains the flow counter data by accessing references to the flow counter data and/or the flow counter data stored by the TCAM. In one embodiment of the invention, the flow counter data is obtained by the switch operating system (SOS) periodically. For example, the flow counter data may be obtained by the SOS every few seconds. In one embodiment of the invention, the flow counter data may be obtained in a pull mechanism (i.e., SOS requests the flow counter data from the TCAM periodically) or a push mechanism (i.e., TCAM sends the flow counter data to the SOS periodically).

In Step 304, a flow is selected for further analysis.

In Step 306, a determination is made about whether the flow selected in

Step 304 is active. In one embodiment of the invention, a flow is active if the number of packets received increases over time. Said another way, the flow counter value at a time 2 should be greater than the flow counter value at an earlier time 1. In one embodiment of the invention, the flow is inactive if the number of packets does not increase (i.e., decreases or remains the same) over time.

If a determination is made that the flow is active, the method may proceed to Step 308. In Step 308, the flow counter value in the control plane data structure is updated. As described above, the flow counter value of the flow is not static. Each time the SOS obtains flow counter data, the flow counter value may change. Because the flow is determined to be active in Step 306, the flow counter value increased since the last time the flow counter data was obtained by the SOS. In one embodiment of the invention, the flow counter values for the active flows are stored in a control plane data structure. In one or more embodiments of the invention, the control plane data structure stores multiple flow counter values each at differing time stamps for each flow to obtain historical data of the flow. In such embodiments, updating the control plane data structure may correspond to adding the flow counter value and time stamp of when the flow counter was obtained to the set of flow counter values obtained at different time stamps for the flow. Additionally or alternatively, a flow rate (e.g., bytes/sec, packets/sec, etc.) may be derived from the flow counter value and stored in the control plane data structure.

The control plane data structure may correspond to a hash table, a linked list, an array, or any data structure that stores numerical values and includes functionality to map one or more flow counter values or one or more flow rates to the corresponding flow. For example, the one or more flow counter values may be mapped to a flow using a unique flow identifier. The flow identifier may be alpha, numeric or alphanumeric characters that are used as a key in a hash table that maps to the one or more flow counter values of the flow.

In Step 310, a determination is made about whether additional flows exist. As described above, there may exist multiple flows in the TCAM of the switch. In one embodiment of the invention, the flows are iteratively selected in Step 304. Iteratively selected refers to repeatedly selecting a flow until each flow is selected. By iteratively selecting each flow, the determination may be based on whether the number of iterations is equal to the number of flows. If a determination is made that additional flows exist, the method may return to Step 304.

Returning to Step 306, if a determination is made that the flow is inactive, the method may proceed to Step 310 discussed above. A flow is inactive when the number of packets does not increase over time. In Step 310, if a determination is made that additional flows do not exist, the may proceed to Step 312. In one embodiment of the invention, the determination that additional flows do not exist is based on the number of iterations being equal to the number of flows. In Step 312, a flow in the control plane data structure is selected.

In Step 314, a determination is made about whether the flow is an elephant flow. In one embodiment of the invention, an elephant flow may be a flow that has traffic that is above a threshold over a set duration or period of time. Additionally or alternatively, a flow is an elephant flow if the flow has a weighted average flow rate above a threshold. In one or more embodiments of the invention, the weighted average flow rate may be a function of historical flow rate data and a current flow rate, where more weight may be attributed to historical flow rate data. In one or more embodiments of the invention, the current flow rate is the latest flow counter value of the flow over a set duration. Said another way, the most recent number of bytes or packets received over the flow given a set duration. For example, if the flow counter value for the flow is 25 bytes over a duration of 5 seconds, the current flow rate is 5 bytes/second.

In one or more embodiments of the invention, historical flow rate data may correspond a previously calculated weighted average flow rate for the flow before the current flow rate is observed. In one or more embodiments of the invention, the historical flow rate data may be calculated based on calculating a weighted average flow rate of a limited number or window of previous flow rates. For example, in a first iteration, flow rate 1, flow rate 2, flow rate 3, and flow rate 4 are used to calculate a historical flow rate data when flow rate 5 is the current flow rate. For a second iteration, flow rate 2, flow rate 3, flow rate 4, and flow rate 5 are used to calculate a historical flow rate data when flow rate 6 is the current flow rate. In this example, the moving window is 4. Thus, flow rate 1 is dropped in the historical flow rate data calculation because only the 4 previous flow rates are of interest. In one or more embodiments of the invention, the control plane data structure includes the minimum information to derive the historical flow rate data. (see example below). If a determination is made that the flow is an elephant flow, the method may proceed to Step 316.

In Step 316, any additional actions are performed. In one embodiment of the invention, an additional action includes mirroring a flow to a third party, such as a network monitoring device by a third party company. Mirroring the flow refers to making a copy of the flow for analysis. An application program or an application program category that generated a flow may be identified by mirroring the flow. An application program is software that performs a task, such as a web browser and a file sharing program. An application program category refers to a group of application programs that have one or more shared characteristics. For example, a video editing application and an audio application are both forms of media and may be in a multimedia application program category. An application identifier may then be assigned to a flow. In one embodiment of the invention, the application identifier is one or more alpha, alphanumeric, or numeric characters. The application identifier may then be added as a tag (e.g., quality of service tag) to the flow. In one embodiment of the invention, an application identifier may be used to determine if the flow has any priority. The flow may have priority if the application identifier of the flow is for an application program that is prioritized by a user (e.g., network administrator) of the network. For example, any application program in the application program category of security may be prioritized over application programs in the multimedia application program category.

In Step 318, a flow egress port for a flow is determined. In one embodiment of the invention, a flow egress port is an egress port on the switch through which received packets for the flow are transmitted. In one embodiment of the invention, the flow egress port is determined by the SOS. Inherently, the SOS manages each interface on the switch. An interface is the software representation of a port on the switch, including the flow egress port. The SOS may access the number of bytes transmitted (i.e., number of packets) on each egress port on the switch. However, further processing is needed to tie a particular flow to an egress port on the switch. In cases where ECMP is used, there exist multiple best paths for a flow as described above. Because ECMP may determine multiple egress ports on a switch, the SOS needs further information to determine which of the multiple egress ports is the flow egress port. Moreover, in cases where a LAG group is present, the logical link is recognized by the SOS. However, the knowledge of which egress port in the LAG is the flow egress port is unknown to the SOS.

In one embodiment of the invention, the SOS ties a flow to a flow egress port by emulating the forwarding of the flow by the switch chip. The SOS has access to the switch chip of the switch. In one embodiment of the invention, the switch chip uses a hashing function to determine a flow egress port to forward a received packet of a flow. A hash function is any algorithm that maps an input value (e.g., a source IP address in a tuple of a flow) to an output value (e.g., a flow egress port). Each input value maps to the same output value to stream packets of a flow to the same network path. Because a hashing function is used by the switch chip, the flow egress port for the flow is the same for each incoming packet. The SOS can emulate the hashing of how the flow is forwarded by the switch chip given the tuple of the flow to determine the flow egress port. The flow egress ports for each flow routed through the switch are stored in the flow egress port information.

In Step 320, a determination is made about whether additional flows exists in the control plane data structure. In one embodiment of the invention, the determination about whether additional flows exist is based on whether each element of the control plane data structure (i.e., each active flow) has been selected in Step 312. If a determination is made that additional flows do exists in the control plane data structure, the method may return to Step 312. In one embodiment of the invention, additional flows exist when each active flow in the control plane data structure has not yet been selected in Step 312.

Returning to Step 314, if a determination is made that the flow is not an elephant flow, the method may proceed to Step 320 discussed above. In one embodiment of the invention, the flow may not be an elephant flow if the weighted average flow rate of the flow is not above a threshold as described above.

In Step 320, if a determination is made that additional flows do not exist in the control plane data structure, the method may proceed to Step 322. In one embodiment of the invention, additional flows do not exist when each active flow in the control plane data structure has been selected in Step 312.

In Step 322, port congestion information is obtained. In one embodiment of the invention, port congestion information is the port congestion data for each egress port on the switch. The port congestion data is a flag to indicate if an egress port is congested or not congested. For example, a flag may be a numerical value where 1 indicates that the egress port is congested and 0 indicates that the egress port is not congested. In one embodiment of the invention, an egress port is congested if the forwarding of a packet is delayed or dropped. In one embodiment of the invention, port congestion information is obtained by the SOS from the data plane. The SOS includes functionality to track the latency of each port on the switch. Latency is the time between when the packet is received to when the packet is forwarded. In one embodiment of the invention, each switch is configured with an expected latency. If the latency of a port is above the expected latency, the SOS may flag the port as congested.

In Step 324, a new egress port for the flow is selected based on the port congestion information and the flow egress port information. As described above, the port congestion information provides which egress ports on the switch are congested. The flow egress port information ties each flow to a flow egress port on the switch. In one embodiment of the invention, the SOS accesses the multiple best paths found through the use of ECMP to determine alternate egress ports for the flow. In one embodiment of the invention, the SOS recognizes the presence of a LAG. The SOS may then use the egress ports of the LAG that are not the flow egress port as alternate egress ports for the flow. The determination of which alternate egress port to use as the new egress port for the flow is done by ensuring the new egress port is not congested using the port congestion information. Further, the new egress port should have the least traffic based on the flow egress port information. In one embodiment of the invention, if a flow is mirrored in Step 316, a tag (e.g., quality of service tag) on the flow may indicate that the application identifier has priority. The determination of which alternate egress port to use may then take into account the application that generated the flow along with the congestion information and flow egress port information to maintain the priority on the flow.

The congestion information for each egress port on the switch and the flow egress port information for each flow are considered to avoid reassignment of a flow egress port each time the SOS accesses the congestion information and flow egress port information. For example, consider a scenario in which port A is congested by flow A. Port B is an alternate egress port that is not congested based on the port congestion information. However, flow B that is an elephant flow uses port B. If the flow egress port information is not considered, port B may be selected as the new egress port for flow A. This may subsequently lead to the congestion of port B. The next time the congestion information is obtained by the SOS, port B is congested, while port A is no longer congested. Again, if the flow egress port information is not considered, flow A may be moved from port B back to port A. The cycling of flow A from port A to port B and back may be avoided by moving flow A to a possible alternate egress port with the least traffic based on the flow egress port information.

In Step 326, a request is sent to update the switch chip on the switch. The request specifies that any subsequently received packets for the flow should be forwarded out of the new egress port selected in Step 324. In one embodiment of the invention, the request is sent by the SOS. In one embodiment of the invention, the switch chip receives the request. The switch chip then modifies the switch chip entry for the flow. Modifying the switch chip entry results in the switch chip forwarding subsequently received packets to the new egress port.

EXAMPLE

The following example is not intended to limit the scope of the invention. As an example of calculating the weighted average flow rate, consider a scenario in which there are two flows that each transfer a total of 20 kilobytes (KB) over 20 seconds. The flow rate of both flows are polled after a duration of five seconds. Flow 1 transfers 20 KB in the first five seconds, then is idle for the remaining 15 seconds. Flow 2 transfers 5 KB every five seconds. In this example, a weight of ¾ is given to historical flow rate data (hereinafter "historical weight") and a weight of ¼ is given to the current flow rate (hereinafter "current weight"). Therefore, the weighted average flow rate is calculated as follows: weighted average flow rate=(historical flow rate data*historical weight)+(current flow rate*current weight).

In this example, the historical flow rate data is the weighted average flow rate from the previous iteration. To get the current flow rate in units of KB/second, the current flow rate is calculated as follows=KB transferred on the flow over five second duration/five seconds.

Calculating the weighted average flow rate for flow 1 over the 20 seconds is as follows:

Iteration 1: weighted average flow rate=(0 KB/second*historical weight)+(4 KB/second*current weight)=1. The historical flow rate data is 0 because there is no previous iteration.

Iteration 2: weighted average flow rate=(1 KB/second*historical weight)+(0 KB/second*current weight)=0.75. The historical flow rate data is 1 KB/second because that is the value of the weighted average flow rate from iteration 1.

Iteration 3: weighted average flow rate=(0.75 KB/second*historical weight)+(0 KB/second*current weight)=0.56. The historical flow rate data is 0.75 KB/second because that is the value of the weighted average flow rate from iteration 2.

Iteration 4: weighted average flow rate=(0.56 KB/second*historical weight)+(0 KB/second*current weight)=0.42. The historical flow rate data is 0.56 KB/second because that is the value of the weighted average flow rate from iteration 3.

For flow 1, the idle time after the first five seconds decreases the weighted average flow rate over four iterations. If there was a fifth iteration, rather than using historical flow rate data from all previous iterations, for example, a window of four iterations may be implemented. In such a scenario, the historical flow rate data is calculated from the weighted average flow rate of only the last three iterations (i.e., the three iterations the immediately preceded the current iteration).

Calculating the weighted average flow rate for flow 2 over the 20 seconds is as follows:

Iteration 1: weighted average flow rate=(0 KB/second*historical weight)+(1 KB/second*current weight)=0.25. The historical flow rate data is 0 because there is no previous iteration.

Iteration 2: weighted average flow rate=(0.25 KB/second*historical weight)+(1 KB/second*current weight)=0.44. The historical flow rate data is 0.25 KB/second because that is the value of the weighted average flow rate from iteration 1.

Iteration 3: weighted average flow rate=(0.44 KB/second*historical weight)+(1 KB/second*current weight)=0.58. The historical flow rate data is 0.44 KB/second because that is the value of the weighted average flow rate from iteration 2.

Iteration 4: weighted average flow rate=(0.58 KB/second*historical weight)+(1 KB/second*current weight)=0.685. The historical flow rate data is 0.58 KB/second because that is the value of the weighted average flow rate from iteration 3.

For flow 2, the consistent traffic over the 20 seconds increases the weighted average flow rate over the four iterations. If there was a fifth iteration, rather than using historical flow rate data from all previous iterations, a window, for example, of four iterations may be implemented.

FIGS. 4A-4D and 5A-5D show examples in accordance with one or more embodiments of the invention. The following examples are for explanatory purposes only and not intended to limit the scope of the invention.

FIGS. 4A-4D show an example of selecting a new egress port for a flow of a network using ECMP.

Figure 4A:
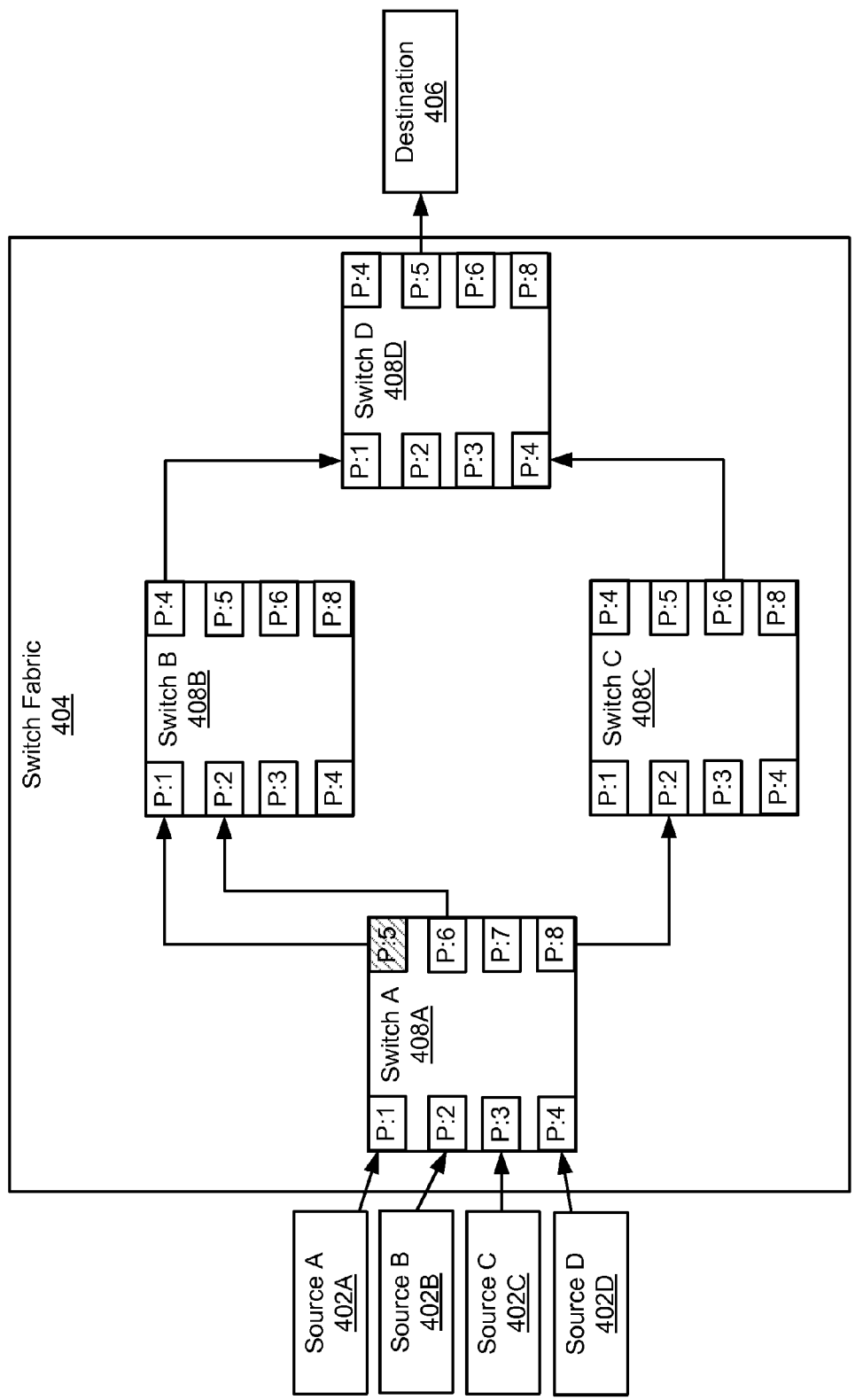
FIGS. 4A-4D and 5A-5D show examples in accordance with one or more embodiments of the invention.

Turning to FIG. 4A, consider a scenario in which there is a data center with a network that includes four sources (402A-402D), a switch fabric (404), and a destination (406). The switch fabric (404) includes four switches (408A-408D). Though not shown in FIG. 4A, there may be more or less than four sources and multiple destinations. Further, each of the switches may be connected to other network devices (not shown) and/or other hosts (not shown).

Continuing with the example in FIG. 4A, the four sources have the same destination (406). ECMP is running on switch A (408A). ECMP informs the SOS of switch A (408A) of three best paths in the network that each lead to the destination (406). The paths cost the same as there are an equal number of hops to reach the destination (406). Path 1 is from egress port p:5 on switch A (408A) to ingress port p:1 on switch B (408B) to egress port p:4 on switch B to ingress port p:1 on switch D (408D) to egress port p:5 on switch D to the destination (406). Path 2 is from egress port p:6 on switch A (408A) to ingress port p:2 on switch B (408B) to egress port p:4 on switch B to ingress port p:1 on switch D (408D) to egress port p:5 on switch D to the destination (406). Path 3 is from egress port p:8 on switch A (408A) to ingress port p:2 on switch C (408C) to egress port p:6 on switch C to ingress port p:4 on switch D (408D) to egress port p:5 on switch D to the destination (406).

The SOS of switch A (408A) obtains port congestion information. In the port congestion information, the port congestion data of egress port p:5 has a flag of 1 indicating that egress port p:5 is congested. Each of the other egress ports on switch A (408A) have a flag of 0 as the port congestion data in the port congestion information indicating that the each of the other ports are not congested.

Figure 4B:
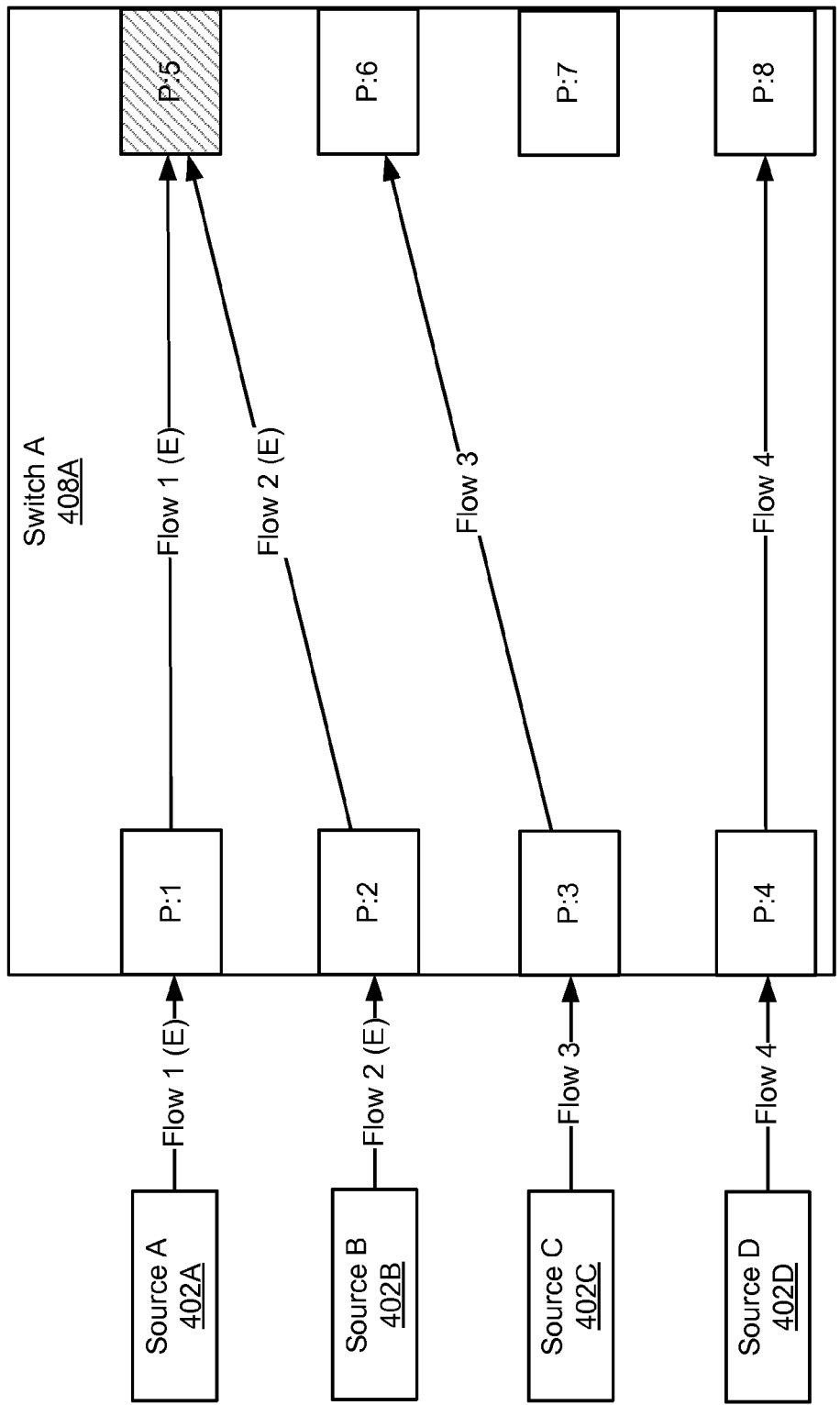

Turning to FIG. 4B, the four flows originating from the four sources are shown. The transmission of each of the four flows through switch A (408A) is also shown.

The SOS of switch A (408A) uses the tuple of flow 1 (E) to emulate how the switch chip of switch A is forwarding packets received on flow 1 (E). The emulation involves using at least the source IP address in the tuple of flow 1 (E) as input to a hashing function. The output of the hashing function indicates that egress port p:5 is the egress port through which the packets on flow 1 (E) are forwarded out of switch A (408A). Similarly, the SOS of switch A (408A) uses the tuple of flow 2 (E) to emulate how the switch chip of switch A is forwarding packets received on flow 2 (E). The output of the hashing function indicates that egress port p:5 is also the egress port through which the packets on flow 2 (E) are forwarded out of switch A (408A). The SOS of switch A (408A) then uses the tuple of flow 3 to emulate how the switch chip of switch A is forwarding packets received on flow 3. The output of the hashing function indicates that egress port p:6 is the egress port through which the packets on flow 3 are forwarded out of switch A (408A). Finally, the SOS of switch A (408A) uses the tuple of flow 4 to emulate how the switch chip of switch A is forwarding packets received on flow 4. The output of the hashing function indicates that egress port p:8 is the egress port through which the packets on flow 4 are forwarded out of switch A (408A).

Additionally, the SOS obtains flow counter data from the TCAM of switch A (408A). For each of the four flows, a weighted average flow rate over a period of time is calculated. A flow is an elephant flow if the weighted average flow rate associated with the flow is above a threshold. The weighted average flow rate of flow 1 (E) and the weighted average flow rate of flow 2 (E) derived from the flow counter data are above the threshold. Therefore both flow 1 (E) and flow 2 (E) are elephant flows. The weighted average flow rate of flow 3 and the weighted average flow rate of flow 4 derived from the flow counter data are below the threshold. Therefore both flow 3 and flow 4 are not elephant flows.

Mapping flow 1 (E) and flow 2 (E) to egress port p:5 and learning that both flows are elephant flows explains why egress port p:5 is congested as described above in FIG. 4A.

Figure 4C:
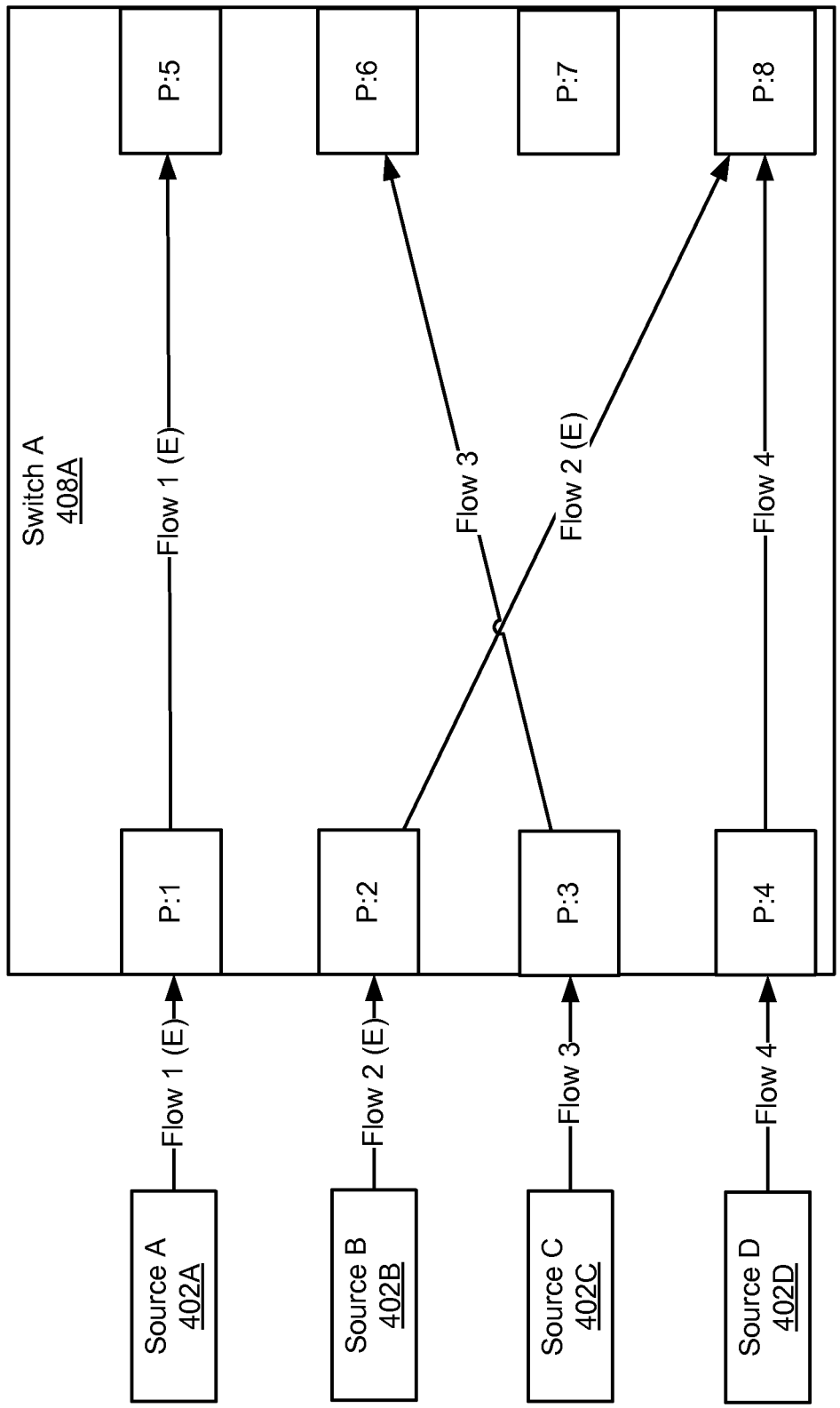

Turning to FIG. 4C, a new egress port on switch A (408A) for flow 2 (E) is selected. As described in FIG. 4A, ECMP identifies egress ports p:6 and p:8 as possible alternate egress ports to egress port p:5 on switch A (408A). The SOS sends a request to the switch chip to subsequently forward packets on flow 2 (E) to egress port p:8. The switch chip receives the request. The request results in the modification of the switch chip entry for flow 2 (E). Once the switch chip entry for flow 2 (E) is modified, received packets are forwarded out through port egress p:8. Alternatively, the SOS may send a request to the switch chip to subsequently forward packets on flow 2 (E) to egress port p:6 (not shown).

The SOS obtains the port congestion information. The port congestion data of egress port p:5 now has a flag of 0 indicating that egress port p:5 is no longer congested.

Figure 4D:
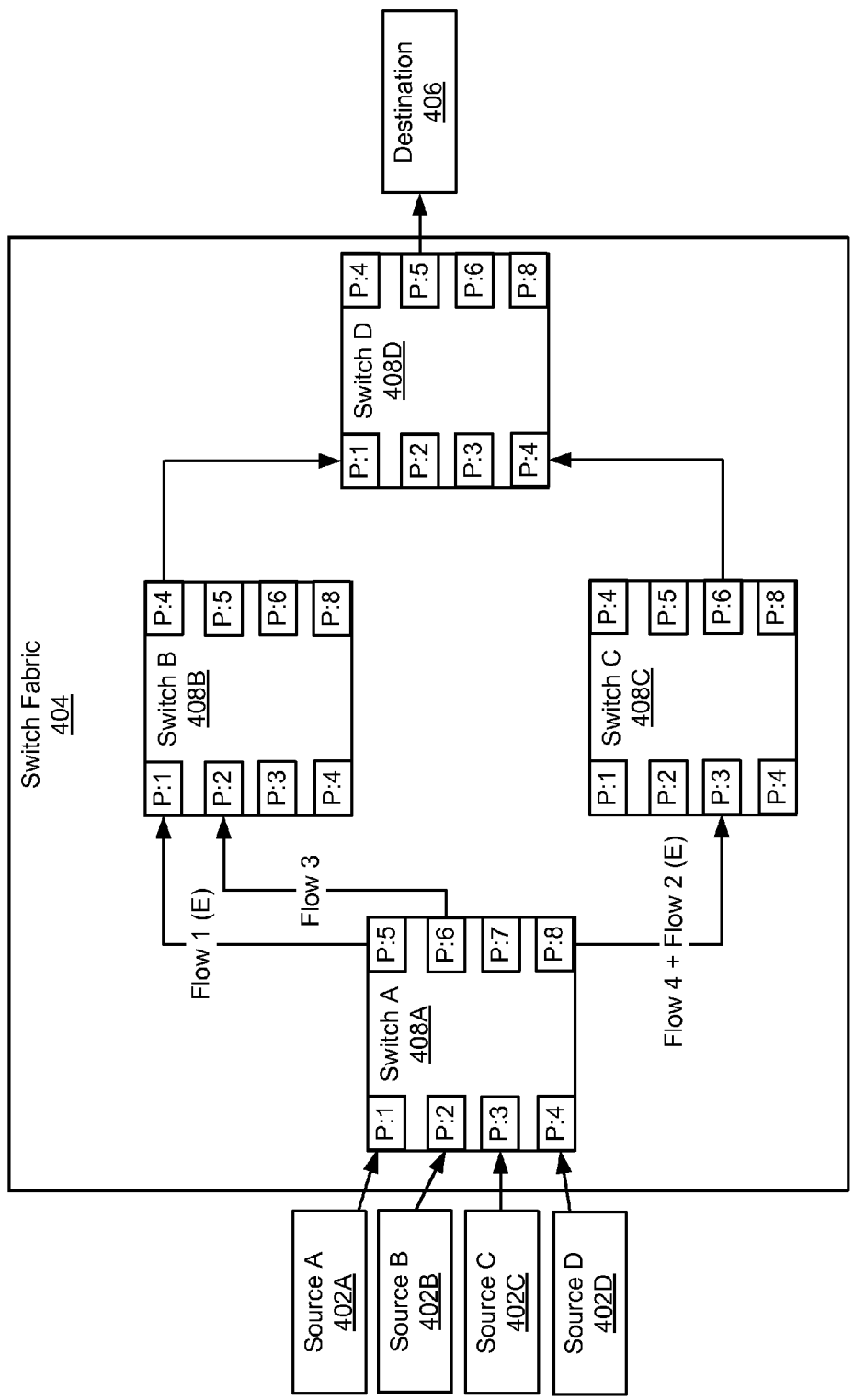

Turning to FIG. 4D, the result of modifying the switch chip entry in FIG. 4C is shown. Each flow and the corresponding path of the flow through the switch fabric (404) to the destination (406) is shown in the datacenter of FIG. 4A given the modified switch chip entry. As described in FIG. 4A, Path 1 is from egress port p:5 on switch A (408A) to ingress port p:1 on switch B (408B) to egress port p:4 on switch B to ingress port p:1 on switch D (408D) to egress port p:5 on switch D to the destination (406). Path 2 is from egress port p:6 on switch A (408A) to ingress port p:2 on switch B (408B) to egress port p:4 on switch B to ingress port p:1 on switch D (408D) to egress port p:5 on switch D to the destination (406). Path 3 is from egress port p:8 on switch A (408A) to ingress port p:2 on switch C (408C) to egress port p:6 on switch C to ingress port p:4 on switch D (408D) to egress port p:5 on switch D to the destination (406).

Flow 1 (E) is on path 1, flow 2 (E) has moved from path 1 to path 3 based on modifying the switch chip entry (described in FIG. 4C above), flow 3 is on path 2, and flow 4 is on path 3. The throughput of packets on flow 1 (E) through egress port p:5 has increased as egress port p:5 is no longer congested.

FIGS. 5A-5D show an example of selecting a new egress port for a flow of a network using LAG.

Figure 5A:
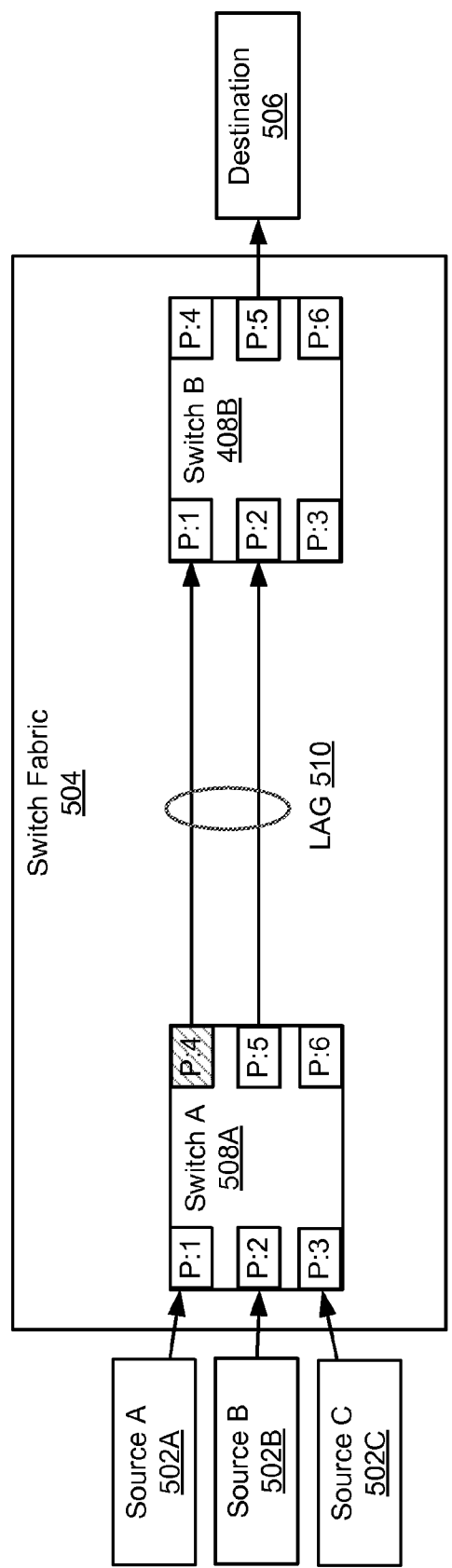

Turning to FIG. 5A, consider a scenario in which there is a data center with a network that includes three sources (502A-502C), a switch fabric (504), and a destination (506). The switch fabric (504) includes two switches (508A-508B). Though not shown in FIG. 5A, there may be more or less than three sources and multiple destinations. Further, each of the switches may be connected to other network devices (not shown) and/or other hosts (not shown).

Two physical links between switch A (508A) and switch B (408B) form a logical link referred to as a LAG (510). The two physical links correspond to the physical link 1 from egress port p:4 on switch A (408A) to ingress port p:1 on switch B (408B) and the physical link 2 from egress port p:5 on switch A to ingress port p:2 on switch B. Both the physical links have equal cost as both reach the destination (506) in the same number of hops. The SOS of switch A (508A) recognizes the presence of the LAG (510). However, the logical link is identifiable by the SOS rather than the particular egress port used by a flow to forward packets from switch A (508A) to switch B (508B).

The SOS of switch A (508A) obtains port congestion information. In the port congestion information, the port congestion data of egress port p:4 has a flag of 1 indicating that egress port p:4 is congested. Each of the other egress ports on switch A (508A) has a flag of 0 as the port congestion data in the port congestion information indicating that each of the other ports are not congested.

Figure 5B:
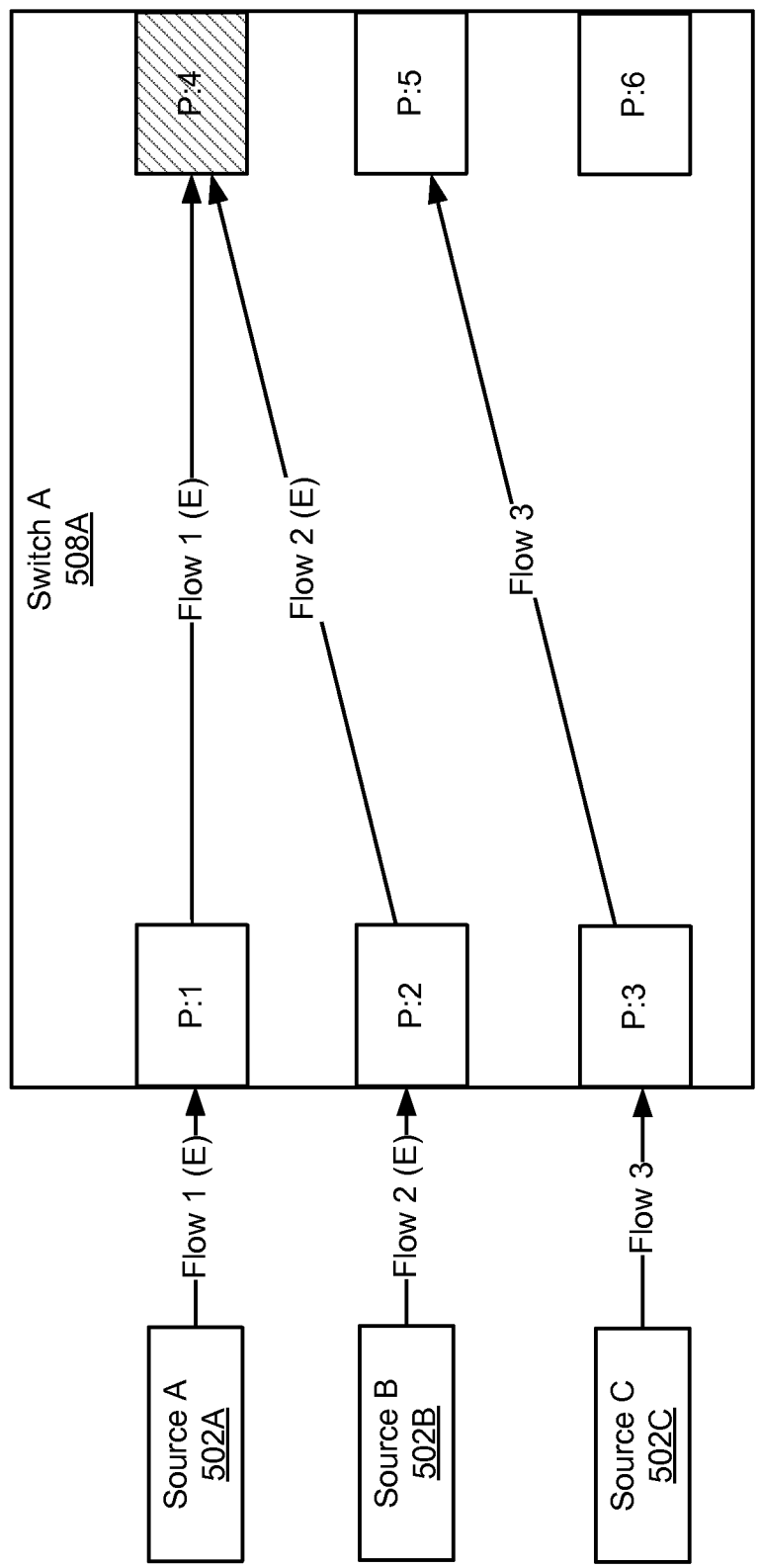

Turning to FIG. 5B, the three flows originating from the three sources are shown. The transmission of each of the three flows through switch A (508A) is also shown.

The SOS of switch A (508A) uses the tuple of flow 1 (E) to emulate how the switch chip of switch A is forwarding packets received on flow 1 (E). The emulation involves using at least the source IP address in the tuple of flow 1 (E) as input to a hashing function. The output of the hashing function indicates that egress port p:4 is the egress port through which the packets on flow 1 (E) are forwarded out of switch A (508A). Similarly, the SOS of switch A (508A) uses the tuple of flow 2 (E) to emulate how the switch chip of switch A is forwarding packets received on flow 2 (E). The output of the hashing function indicates that egress port p:4 is also the egress port through which the packets on flow 2 (E) are forwarded out of switch A (508A). The SOS of switch A (508A) then uses the tuple of flow 3 to emulate how the switch chip of switch A is forwarding packets received on flow 3. The output of the hashing function indicates that egress port p:5 is the egress port through which the packets on flow 3 are forwarded out of switch A (508A).

Continuing with the example of FIG. 5B, the SOS obtains flow counter data. For each of the three flows, a weighted average flow rate over a period of time is calculated. A flow is an elephant flow if the weighted average flow rate associated with the flow is above a threshold. The weighted average flow rate of flow 1 (E) and the weighted average flow rate of flow 2 (E) derived from the flow counter data are above the threshold. Therefore both flow 1 (E) and flow 2 (E) are elephant flows. The weighted average flow rate of flow 3 is below the threshold. Therefore flow 3 is not an elephant flow.

Mapping flow 1 (E) and flow 2 (E) to egress port p:4 and learning that both flow 1 (E) and flow 2 (E) are elephant flows explains why egress port p:4 is congested as described above in FIG. 5A.

Figure 5C:
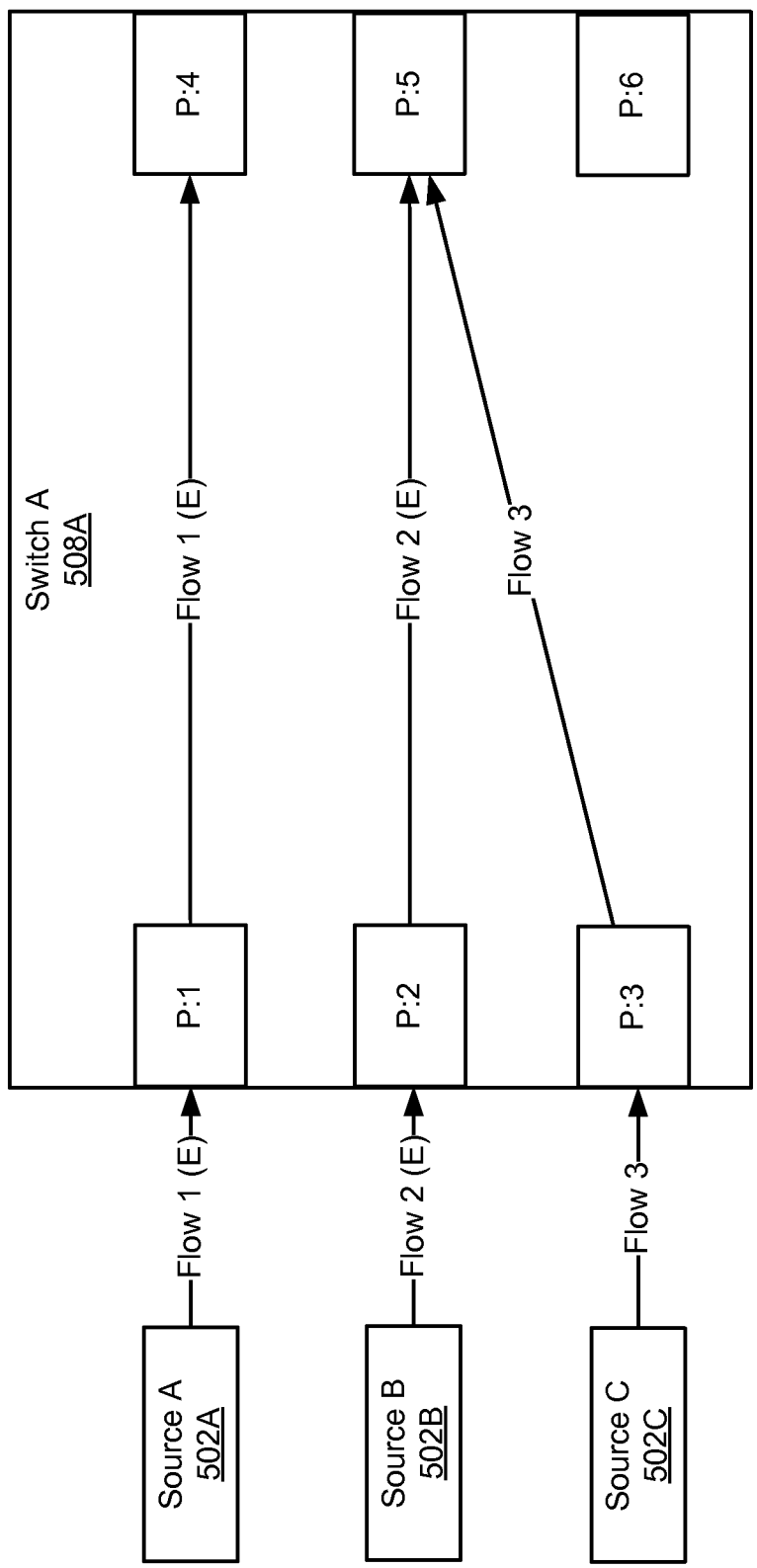

Turning to FIG. 5C, a new egress port on switch A (508A) for flow 2 (E) is selected. As described in FIG. 5A, the LAG (510) identifies egress ports p:5 as an alternate egress port to egress port p:4 on switch A (508A). The SOS sends a request to the switch chip to subsequently forward packets on flow 2 (E) to egress port p:5. The switch chip receives the request. The request results in the modification of the switch chip entry for flow 2 (E). Once the switch chip entry for flow 2 (E) is modified, received packets are forwarded out through egress port p:5.

The SOS obtains the port congestion information. The port congestion data of egress port p:4 now has a flag of 0 indicating that egress port p:4 is no longer congested.

Figure 5D:
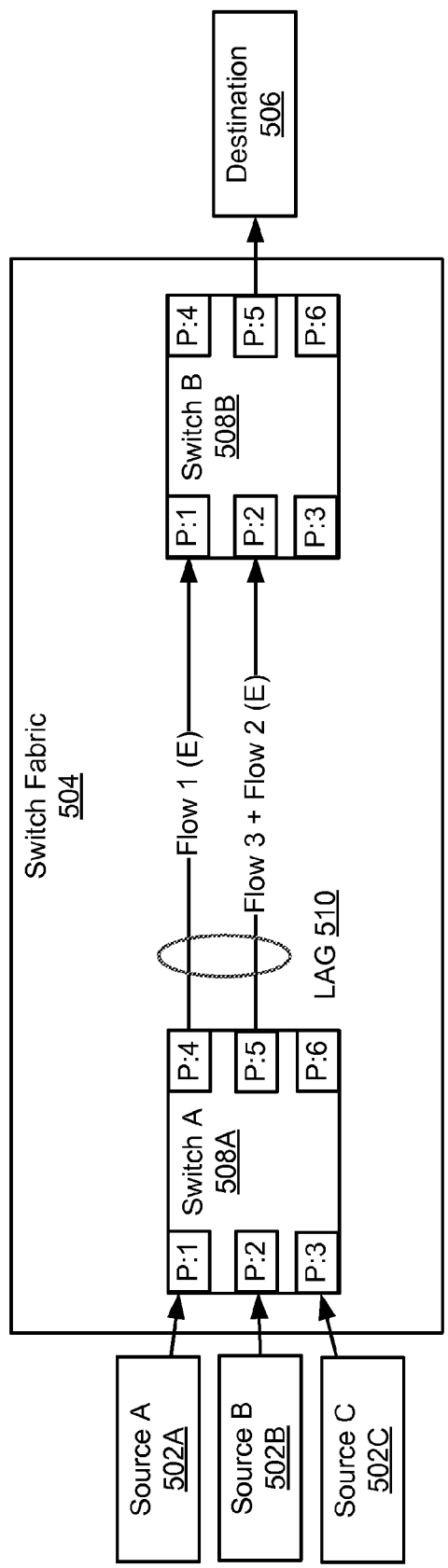

Turning to FIG. 5D, the result of modifying the switch chip entry in FIG. 5C is shown. Each flow and the corresponding path of the flow through the switch fabric (504) to the destination (506) is shown in the datacenter of FIG. 5A given the modified switch chip entry. As described in FIG. 5A, either of the physical links forming the LAG (510) may be used to reach the destination (506). The two physical links correspond to the physical link 1 from egress port p:4 on switch A (508A) to ingress port p:1 on switch B (508B) and the physical link 2 from egress port p:5 on switch A to ingress port p:2 on switch B. Flow 1 (E) is uses physical link 1, flow 2 (E) has moved from physical link 1 to physical link 2 based on modifying the switch chip entry (described in FIG. 5C above), and flow 3 uses physical link 2. The throughput of packets on flow 1 (E) through egress port p:4 has increased as port egress p:4 is no longer congested.

Embodiments of the invention automate the tracking of flows in a network to identify a congested port on a switch in the network. Additionally, the switch chip of the switch may modify the switch entry to forward subsequent packets to an alternate port on the switch to reduce congestion at the switch. The reduction of congestion may lead to a higher throughput achieved by the network.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor on a switch perform a method, the method comprising:

receiving, by a switch operating system (SOS), a first flow counter value for a flow of a first plurality of flows;

determining, using the first flow counter value, that the flow is an elephant flow, wherein the flow is associated with one selected from a group consisting of a flow rate that is above a first threshold and a weighted average flow rate that is above a second threshold;

obtaining flow egress port information by determining an egress port from a plurality of egress ports on the switch for each of the first plurality of flows;

obtaining port congestion information for the switch, wherein the port congestion information comprises at least one selected from a group consisting of port congestion data for the egress port indicating that a packet was dropped by the egress port and port congestion data for the egress port indicating that a latency of the egress port exceeds an expected latency of the egress port;

selecting, based on the port congestion information and the flow egress port information, a new egress port for the flow; and sending a request to update a switch chip on the switch, wherein the request specifies that subsequently received packets for the flow are to be forwarded out of the new egress port.

2. The non-transitory computer readable medium of claim 1, further comprising:

mirroring the flow; and obtaining, in response to mirroring the flow, an application identifier for an application that generated the flow, wherein selecting the new egress port for the flow is further based on the application identifier.

3. The non-transitory computer readable medium of claim 1, further comprising:

obtaining first flow counter data at a first time, wherein the first flow counter data comprises a first plurality of flow counter values for the first plurality of flows, wherein the first flow counter value is one of the plurality of the first flow counter values;

obtaining second flow counter data at a second time, wherein the second flow counter data comprises a second plurality of flow counter values for the second plurality of flows, and wherein the flow is one of the second plurality of flows, wherein a second flow counter value for the flow is one of the plurality of the second flow counter values;

making a first determination, for the flow, that the second flow counter value is greater than the first flow counter value; and making a second determination, in response to first determination, that the flow is active.

4. The non-transitory computer readable medium of claim 1, further comprising:

obtaining first flow counter data at a first time, wherein the first flow counter data comprises a first plurality of flow counter values for the first plurality of flows, wherein the first flow counter value is one of the plurality of the first flow counter values;

obtaining second flow counter data at a second time, wherein the second flow counter data comprises a second plurality of flow counter values for the second plurality of flows, and wherein the flow is one of the second plurality of flows, wherein a second flow counter value for the flow is one of the plurality of the second flow counter values;

making a first determination, for the flow, that the second flow counter value is not greater than the first flow counter value; and making a second determination, in response to first determination, that the flow is inactive.

5. The non-transitory computer readable medium of claim 1, wherein obtaining flow egress port information by determining an egress port from a plurality of egress ports on a switch for each of the first plurality of flows further comprises:

emulating forwarding packets associated with flow by the switch chip using a tuple associated with the flow, wherein the tuple comprises a source Internet Protocol (IP), a source port, a destination IP, a destination port, and a protocol.

6. The non-transitory computer readable medium of claim 5, wherein the tuple associated with the flow is stored in a ternary content-addressable memory (TCAM).

7. The non-transitory computer readable medium of claim 1, wherein selecting, based on the port congestion information and the flow egress port information, the new egress port for the flow:

using equal-cost multi-path (ECMP) to identify the new egress port.

8. The non-transitory computer readable medium of claim 1, wherein selecting, based on the port congestion information and the flow egress port information, the new egress port for the flow further comprises:

identifying a link aggregation (LAG) group to identify an alternate egress port to forward the elephant flow.

9. The non-transitory computer readable medium of claim 1, wherein determining that the flow is an elephant flow further comprises:

calculating a weighted average flow rate of the flow over a duration, wherein the weighted average flow rate is based on historical flow rate data of the flow and a current flow rate, and wherein the current flow rate is derived from the flow counter value for the flow; and determining, based on the weighted average flow rate of the flow, that the weighted average flow rate is above a threshold.

10. A method for modifying a flow on a switch, the method comprising:

receiving, by a switch operating system (SOS), a first flow counter value for a flow of a first plurality of flows;

identifying, using the first flow counter value, that the flow is an elephant flow, wherein the flow is associated with one selected from a group consisting of a flow rate that is above a first threshold and a weighted average flow rate that is above a second threshold;

obtaining flow egress port information by determining an egress port from a plurality of egress ports on the switch for each of the first plurality of flows;

obtaining port congestion information for the switch, wherein the port congestion information comprises at least one selected from a group consisting of port congestion data for the egress port indicating that a packet was dropped by the egress port and port congestion data for the egress port indicating that a latency of the egress port exceeds an expected latency of the egress port;

selecting, based on the port congestion information and the flow egress port information, a new egress port for the flow; and sending a request to update a switch chip on the switch, wherein the request specifies that subsequently received packets for the flow are to be forwarded out of the new egress port.

11. The method of claim 10, further comprising:
mirroring the flow; and
obtaining, in response to mirroring the flow, an application identifier for an application that generated the flow, wherein selecting the new egress port for the flow is further based on the application identifier.

12. The method of claim 10, further comprising:

obtaining first flow counter data at a first time, wherein the first flow counter data comprises a first plurality of flow counter values for the first plurality of flows, wherein the first flow counter value is one of the plurality of the first flow counter values;

obtaining second flow counter data at a second time, wherein the second flow counter data comprises a second plurality of flow counter values for the second plurality of flows, and wherein the flow is one of the second plurality of flows, wherein a second flow counter value for the flow is one of the plurality of the second flow counter values;

making a first determination, for the flow, that the second flow counter value is greater than the first flow counter value; and making a second determination, in response to first determination, that the flow is active.

13. A switch, comprising:
a switch chip;
a plurality of egress ports;
memory;
a data plane, wherein the data plane comprises the switch chip, the plurality of egress ports, and the memory;
a processor;
a switch operating system (SOS); and
a control plane comprising the processor and the SOS, the SOS comprising instructions, which when executed by the processor, enable the switch to perform a method, the method comprising:

receiving, by the SOS and from the memory in the data plane, a first flow counter value for a flow of a first plurality of flows;

identifying, using the first flow counter value, that the flow is an elephant flow, wherein the flow is associated with one selected from a group consisting of a flow rate that is above a first threshold and a weighted average flow rate that is above a second threshold;

obtaining flow egress port information by determining an egress port from the plurality of egress ports on the switch for each of the first plurality of flows;

obtaining port congestion information for the switch, wherein the port congestion information comprises at least one selected from a group consisting of port congestion data for the egress port indicating that a packet was dropped by the egress port and port congestion data for the egress port indicating that latency of the egress port exceeds an expected latency of the egress port;

selecting, based on the port congestion information and the flow egress port information, a new egress port for the flow; and sending a request to the switch chip in the data plane to update the switch chip, wherein the request specifies that subsequently received packets for the flow are to be forwarded out of the new egress port.

14. The switch of claim 13, wherein the data plane is further configured to:
  receive the request to update the switch chip; and
  forward subsequently received packets for the flow out of the new egress port.

15. The switch of claim 13, wherein the SOS is further configured to:
  mirror the flow to obtain an application identifier for an application that generated the flow,
  wherein selecting the new egress port for the flow is further based on the application identifier.

16. The switch of claim 13, wherein the SOS is further configured to:
  obtain first flow counter data at a first time, wherein the first flow counter data comprises a first plurality of flow counter values for the first plurality of flows, wherein the first flow counter value is one of the plurality of the first flow counter values;
  obtain second flow counter data at a second time, wherein the second flow counter data comprises a second plurality of flow counter values for the second plurality of flows, and wherein the flow is one of the second plurality of flows, wherein a second flow counter value for the flow is one of the plurality of the second flow counter values;
  make a first determination, for the flow, that the second flow counter value is greater than the first flow counter value; and
  make a second determination, in response to first determination, that the flow is active.

17. The switch of claim 13, wherein the SOS is further configured to:
  obtain first flow counter data at a first time, wherein the first flow counter data comprises a first plurality of flow counter values for the first plurality of flows, wherein the first flow counter value is one of the plurality of the first flow counter values;
  obtain second flow counter data at a second time, wherein the second flow counter data comprises a second plurality of flow counter values for the second plurality of flows, and wherein the flow is one of the second plurality of flows, wherein a second flow counter value for the flow is one of the plurality of the second flow counter values;
  make a first determination, for the flow, that the second flow counter value is not greater than the first flow counter value; and
  make a second determination, in response to first determination, that the flow is inactive.

18. The switch of claim 13, wherein the SOS is further configured to:
  obtain first flow counter data at a first time, wherein the first flow counter data comprises a first plurality of flow counter values for the first plurality of flows, wherein the first flow counter value is one of the plurality of the first flow counter values;
  obtain second flow counter data at a second time, wherein the second flow counter data comprises a second plurality of flow counter values for the second plurality of flows;
  make a first determination, that the flow is not one of the second plurality of flows for the flow; and
  make a second determination, in response to first determination, that the flow is invalid.

19. The switch of claim 13, wherein selecting, based on the port congestion information and the flow egress port information, the new egress port for the flow further comprises:
  emulating forwarding packets associated with flow by the switch chip using a tuple associated with the flow, wherein the tuple comprises a source Internet Protocol (IP), a source port, a destination IP, a destination port, and a protocol.

20. The switch of claim 13, wherein identifying, using the first flow counter value, that the flow is an elephant flow further comprises:
  ranking the plurality of flows based on a bandwidth of each flow of the plurality of flows to obtain a plurality of ranked flows; and
  identifying a percentage of the plurality of ranked flows as elephant flows to obtain a plurality of elephant flows, wherein the plurality of elephant flows comprises the flow.

* * * * *